United States Patent
Mooney

[11] Patent Number: 5,966,970
[45] Date of Patent: Oct. 19, 1999

[54] LOCKABLE FUEL VALVE

[75] Inventor: Brian Francis Mooney, Dun Laoghaire, Ireland

[73] Assignee: John O'Keeffe, Carrick-on-Suir, Ireland

[21] Appl. No.: 08/840,010

[22] Filed: Apr. 24, 1997

Related U.S. Application Data

[63] Continuation of application No. 08/545,632, filed as application No. PCT/IE94/00016, Mar. 22, 1994, abandoned.

[30] Foreign Application Priority Data

Mar. 23, 1993 [IE] Ireland ................................... S930224

[51] Int. Cl.$^6$ ............................. B60R 25/04; F16K 35/00
[52] U.S. Cl. ..................... 70/242; 137/384.6; 137/384.8; 70/175; 70/179
[58] Field of Search ............................. 70/242, 243, 175, 70/176, 179, DIG. 52; 137/384.6, 384.8, 115.13, 115.26; 251/80

[56] References Cited

U.S. PATENT DOCUMENTS

| | | | |
|---|---|---|---|
| 1,153,189 | 9/1915 | Blything | 70/242 |
| 1,211,756 | 1/1917 | Reid | 70/242 |
| 1,217,406 | 2/1917 | Burkhardt | 70/242 |
| 1,303,878 | 5/1919 | Fuchs | 70/242 |
| 1,328,616 | 1/1920 | Cassingham et al. | 70/242 |
| 2,906,284 | 9/1959 | Lau | 70/242 |
| 3,630,306 | 12/1971 | Shur | 180/114 |
| 3,682,267 | 8/1972 | Kayser | 180/114 |
| 3,747,378 | 7/1973 | Hiatt | 70/257 |
| 3,750,430 | 8/1973 | Crisa | 70/1.5 |
| 3,776,263 | 12/1973 | Hubenthal | 137/284.8 |
| 3,792,712 | 2/1974 | Fontana | 137/384.2 |
| 3,838,587 | 10/1974 | Good | 70/243 |
| 3,855,828 | 12/1974 | Verderber | 70/243 |
| 3,879,969 | 4/1975 | Pynn | 70/242 |
| 3,885,586 | 5/1975 | Tibbetts . | |
| 4,084,657 | 4/1978 | Bradley et al. | 180/114 |
| 4,131,127 | 12/1978 | Ferro et al. | 137/384.6 |
| 4,174,725 | 11/1979 | LaPere | 137/68 R |
| 4,190,198 | 2/1980 | Casuga et al. | 236/34.5 |
| 4,208,032 | 6/1980 | Mineur | 251/69 |
| 4,217,925 | 8/1980 | Clark | 127/385 |
| 4,422,314 | 12/1983 | Cooper | 70/242 |
| 4,489,748 | 12/1984 | Fluetsch | 137/384.4 |
| 4,726,202 | 2/1988 | Loacano | 70/242 |
| 4,751,832 | 6/1988 | Carballo | 70/242 |
| 5,190,074 | 3/1993 | Christopher . | |
| 5,289,843 | 3/1994 | Smith . | |

FOREIGN PATENT DOCUMENTS

| | | |
|---|---|---|
| 2 138 170 | 12/1972 | France . |
| 2 647 877 | 12/1990 | France . |
| 640 533 | 1/1937 | Germany . |
| 28 01 683 | 7/1978 | Germany . |
| 130344 | 8/1919 | United Kingdom . |
| 190832 | 1/1923 | United Kingdom . |
| 422494 | 1/1935 | United Kingdom . |
| 988912 | 4/1965 | United Kingdom . |
| 2 196 413 | 4/1988 | United Kingdom . |
| 89/03329 | 4/1989 | WIPO . |

Primary Examiner—Suzanne Dino Barrett
Assistant Examiner—Tuyet-Phuong Pham
Attorney, Agent, or Firm—Jacobson, Price, Holman & Stern, PLLC

[57] ABSTRACT

A lockable valve (7) for a fuel line contains a fuel inlet (2) and fuel outlet (3) which communicates with one another via a passage (6) in which is located a spring-biased piston (15) which is responsive to a pressure change in the fuel line. Associated with the piston (15) is a spring biased plunger (11) which controls a valve (8) to close or restrict the flow of fuel through passage (6). At the other end of the piston (15) is a resetting device (23, 24) which requires an unlocking action before the piston can be extended to withdraw the plunger 11 so as to open the valve. When a fall in pressure is detected by the piston (15), it causes operation of the valve (8) to stop or restrict fuel flow but this operation may only be reversed by the unlocking action.

8 Claims, 3 Drawing Sheets

LOCKABLE FUEL VALVE

This application is a file wrapper continuation of application Ser. No. 08/545,632, filed Jan. 11, 1996, abandoned, which is a 371 of PCT/IE94/00016 filed Mar. 22, 1994.

FIELD OF THE INVENTION

This invention relates to a lockable fuel valve which can be inserted into various types of fuel lines. More particularly, the invention relates to a lockable fuel valve for use with motor vehicles.

BACKGROUND OF THE INVENTION

A number of devices exist by which engines can be immobilised to prevent theft or misuse of a vehicle or machinery etc. Many devices are mainly concerned with the locking or disconnection of electrical circuits associated with the engine which prevents the engine from being activated. It has been found that most or all the currently available methods which utilise the locking or disconnection of engine electrical circuits in vehicles can be over-ridden, by-passed or otherwise neutralised so allowing the theft or misuse of the vehicle.

Vehicles can also be immobilised with varying degrees of success using mechanical devices ranging from steering wheel and brake locks to lockable fuel valves.

French Patent Specification No. 2138170 (Emca Reg. Trust), German Patent Specification No. 640 533 (A. H. Adelsohn, J. F. Hultman), French Patent Specification No. 2647 877 (Alexanare Yanacopoulo), also disclose key actuated lockable fuel valves. Similarly, British Patent Specification Nos. 2 196 413 (Spouse), 130 344 (Emca Reg. Trust), 988 912 (Ross Courtney and Company Limited, 422 494 (Adelsohn), 190 832 (Hopkins) and U.S. Pat. No. 3,885,586 (Tibbets) and U.S. Pat. No. 3,838,587 (Good) all describe various types of fuel valves to prevent vehicle theft.

SUMMARY OF THE INVENTION

The present invention provides a lockable valve for a fuel line including an element which is responsive to a pressure change in the fuel line, the pressure responsive element being associated with a fuel flow closure or restriction means, and a locking means associated with the closure or restriction means, whereby when a particular change or pressure in the fuel line is detected by the pressure responsive element, it causes operation of the closure or restriction means to stop or restrict fuel flow but which can be reversed by an unlocking or switching action to the locking means.

This provides the potential advantage that the valve can be self locking and can be operated without the need, expense or inconvenience of external controls such as might be conventionally provided by electrical or electronic devices.

Advantageously, a resetting or overcoming means is included which requires an unlocking or switching action whereby operation of the closure or restriction means to stop or restrict fuel flow can be reversed by an unlocking or switching action to the resetting or overcoming means.

Advantageously, the resetting or overcoming means is operable by a security device such as a key operable lock. However, other security devices may also be used, including mechanical and/or electronic means.

Advantageously, the pressure responsive element comprises a member such as a piston, diaphragm or bellows which is movable by a particular change of pressure in the fuel line, such as occurs at the stoppage of fuel pumping, to operate the closure or restriction means to close or restrict the valve in a closed or restricted mode until released by the resetting or overcoming means.

Advantageously, a delay mechanism is provided between the pressure responsive element and the closure or restriction means, the delay mechanism having a restricted flow device operable to allow partial fuel flow for a period after the detection of a particular pressure change.

Advantageously, the closure or restriction means includes a movable member operable by the pressure responsive element, the movable member being movable between an unlocked position and a locked position and being returnable to the unlocked position subsequent to the operation of the resetting or overcoming means.

BRIEF DESCRIPTION OF THE DRAWINGS

An embodiment of the invention, suitable as a lockable fuel valve herein referred to as a fuel lock for a vehicle with a fuel injection engine, will now be described by way of example. Reference is made to the accompanying drawings in which.

DETAILED DESCRIPTION OF THE PREFERRED EMBODIMENTS

In vehicles with fuel injected engines, the fuel line usually extends under the vehicle floor from a fuel pump situated near the vehicle fuel tank at the rear of the vehicle to the fuel injection system at the front of the vehicle. The fuel line is usually fitted with a pressure regulating relief valve, located near the fuel injection system, set at the desired working pressure, which will be below the maximum pressure which can be developed by the pump. The relief valve returns a proportion of the pumped fuel back to the fuel tank via a second fuel line which normally runs alongside the primary fuel line. The fuel pump is usually provided with a non-return valve to ensure that the primary fuel line remains filled with fuel by preventing fuel draining back to the tank when the pump is not running.

Typically, the fuel lock is positioned in the fuel line towards the front of the vehicle and under the vehicle floor and a key activated locking mechanism on the fuel lock projects through the vehicle floor into the vehicle cabin. The fuel lock is usually attached to the underside of the floor by secure bolts through holes 35.

Figure 1:
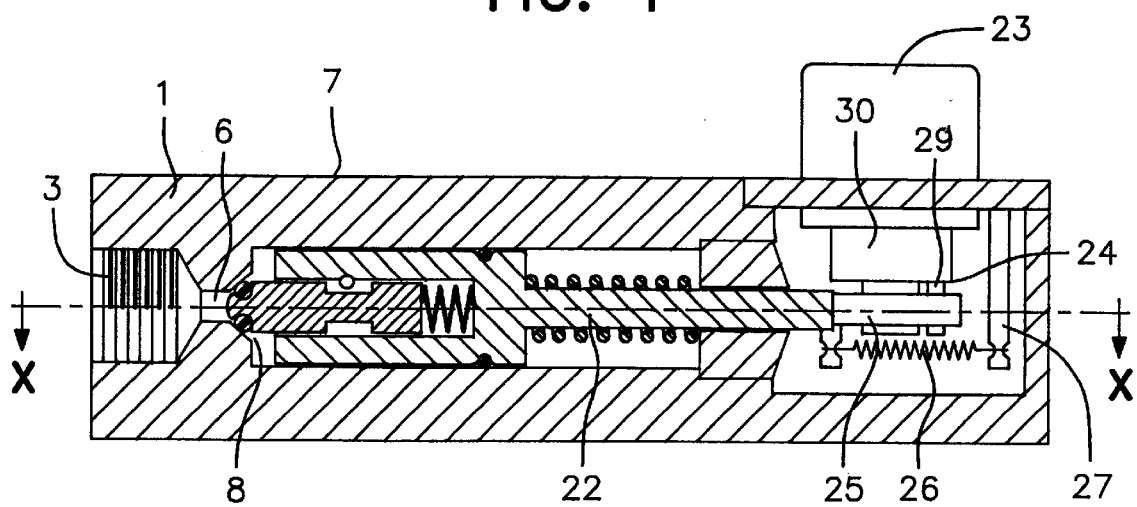
FIG. 1 shows a side view section of the fuel lock, along Y—Y of FIG. 2.
Figure 2:
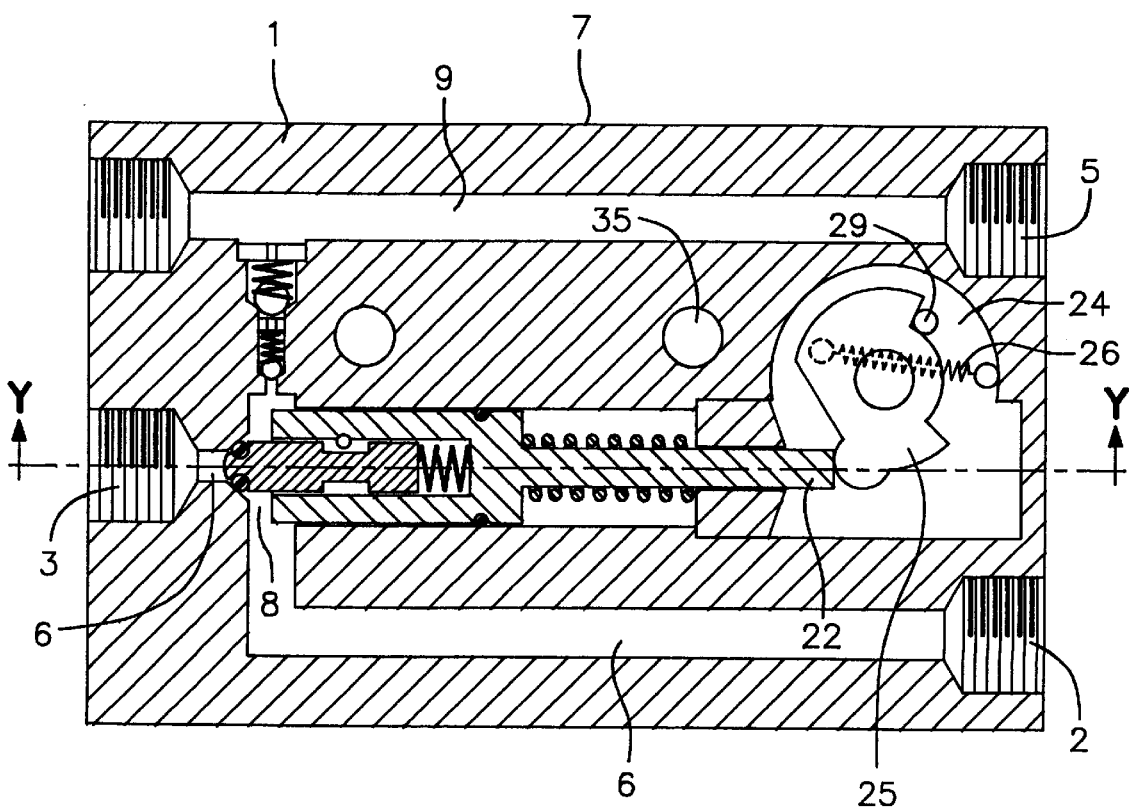
FIG. 2 shows a top section of the same fuel lock along X—X of FIG. 1.
Figure 3:
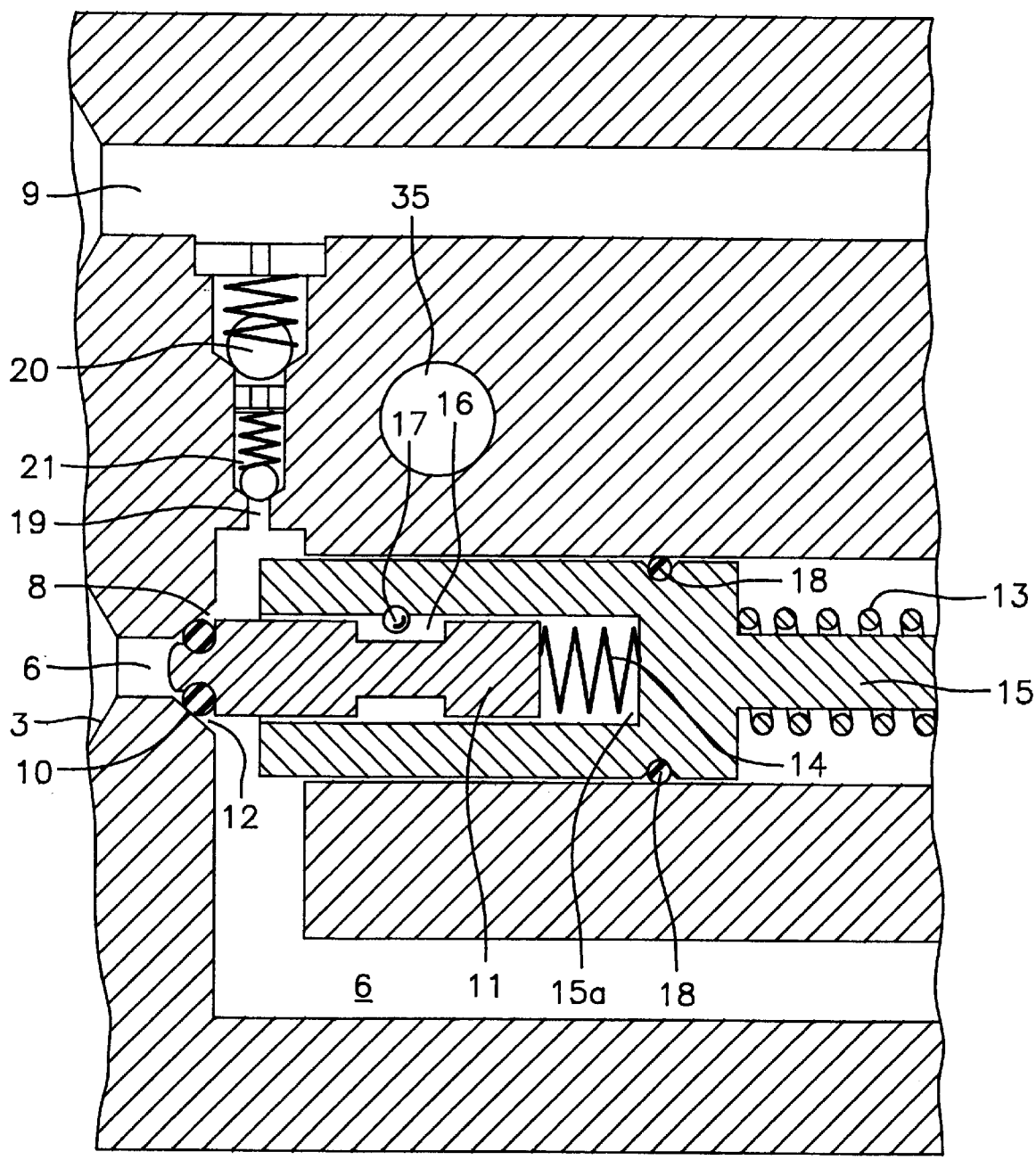
FIG. 3 shows an enlarged view of a portion of FIG. 2.

Referring now to FIGS. 1, 2 and 3, the fuel valve 7 is made up of a body 1 which contains a fuel inlet 2 and fuel outlet 3 which communicate with the fuel line from the fuel pump to the injection system and a return inlet 4 and return outlet 5 which communicate with the return line from the relief valve (not shown) to the tank. The fuel inlet 2 communicates with the fuel outlet 3 via a passage 6 defined in the body 1 of the fuel valve 7. A stop valve 8 is mounted in the passage 6. The return inlet 4 communicates with the return outlet via a passage 9 defined in the body 1 of the fuel valve 7.

The stop valve 8 is made up of a flexible seal 10 mounted on a plunger 11 which is urged against a seat 12 by the action of two compression springs 13 and 14. The plunger 11 is located in a blind hole in a piston 15. Both the plunger 11 and piston 15 comprise cylindrical surfaces and are assembled with their axes coincident. The plunger 11 can move to a limited degree in a direction along its axis within the hole in the piston 15. The movement is limited by a pin 17 fixed to the piston which is partially located within an annular groove 16 in the plunger 11. A compression spring 14 is positioned at the bottom of the hole 15a in the piston 15 and at all times attempts to urge the plunger 11 out of the hole 15a. The front end of the plunger 11 is shaped such as to allow a circumferential seal 10 of a flexible material which is impervious to fuel, such as VITON, to be securely mounted. A circumferential seating 12, with axis coincident with the plunger 11 and seal 10, is provided which prevents any flow of fuel through passage 6 when the plunger 11 and seal 10 are urged against it.

Undesired leakage of fuel from the passage 6 past the outer bore of the piston 15 is prevented by a circumferential seal 18 located in an annular groove in the piston 15.

The fuel passage 6 also communicates with the return passage 9 via a cross passage 19 and in which two pressure relief valves 20 and 21 are situated in series. The higher pressure relief valve 21 is set at a pressure above that of the main pressure relief valve situated near the fuel injection system and thus is always closed during normal running of the fuel system. It will, however, open and return fuel back to the tank via the return passage 9 if the fuel pump continues to run with the stop valve 8 closed. This is provided as a protection against damage to the fuel pump or fuel system.

The seating of the higher pressure relief valve 21 is also provided with a small notch (not shown) which allows a small amount of fuel to leak past it into the return line 9 when the fuel line 6 is pressurized. The purpose of this leakage notch is to allow the plunger 11 and piston 15 move towards the stop valve seating 12 when the fuel pump is stopped, and this movement necessitates the displacement of a small amount of fuel from the fuel line and fuel valve 7.

The leakage notch can also be made in various sizes and this allows the important advantage of enabling the time taken for the plunger 11 and piston 15 assembly valve closing movement to be predetermined as required.

The lower pressure relief valve 20 is set at a pressure which is overcome by the pressure in the fuel passage 6 caused by the force of the compression spring 14 acting via the plunger 11 or by the force of the compression spring 13 acting via the plunger 11 and piston 15. The lower pressure relief valve 20 is, however, set at a pressure above the static pressure which arises from gravitational effects due to differences in elevation of different parts of the fuel line. In particular, the lower pressure relief valve 20 prevents fuel from draining out of the portion of the fuel line between the fuel valve 7 and the injector system when the fuel system is left over a period without the fuel pump running.

The pressure relief valves 20 and 21 comprise the well established method of using a ball held against a seating by a compression spring. These also serve as non-return valves. In particular, the lower pressure-relief valve 20 which does not comprise a leakage notch, prevents any possibility of air entering the fuel passage 6 and fuel line via the return passage 9 and return line.

Alternatively, the higher pressure relief valve 21 may comprise a plunger, spring and seating arrangement and the leakage notch be replaced by a small hole in the plunger.

The operation of the piston 15 and plunger 11 assembly will now be described. The piston spring 13 is arranged such that when the fuel pump pressurizes the fuel line 6, the force exerted on the piston 15 is sufficient to overcome the piston spring 13, together with any other forces resisting retraction of the piston 15, i.e. movement away from the valve seating 12.

On the other hand, the piston spring 13 is arranged such that its force is sufficient to extend the piston, i.e. move it towards the valve seating 12, when the fuel pump stops, thereby displacing fuel from the fuel line 6 into the return line and in so doing to overcome the lower pressure relief valve 20, wall and seal frictions and depress the plunger spring 14 when the seal 10 makes contact with the seating 8.

The plunger spring 14 is arranged such that it is sufficiently weak to be overcome by the piston spring 13 but sufficiently strong to hold the stop valve 8 closed when the piston 15 is held in the extended position and the fuel line 6 is fully pressurized.

When the piston is retracted, the pin 17 and groove 16 in the plunger 11 will ensure that the plunger 11 moves the piston 15 to open the stop valve 8.

The fuel valve 7 is locked and unlocked by means of a key-operated locking mechanism 23 and an engagement mechanism 24 The engagement mechanism 24 comprises a profiled plate 25 which rotates about an axial extension of the lock mechanism 23, an over-centre tension spring 26 connecting the profiled plate 25 to a fixed anchorage pin 27, and a driving pin 29 fixed to the output plate 30 of the lock mechanism 23.

The operation of the fuel valve 7 will now be discussed with reference to the Figures.

Figure 4A:
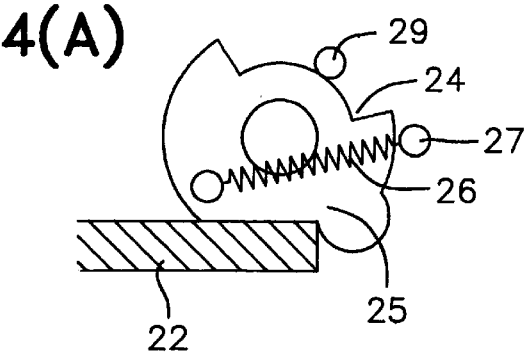
FIGS. 4(I) to 4(V) show five stages in the operation of the lock engagement mechanism, but unlike the previous figures, show the spring 26 in full view for clarity of explanation.
Figure 4B:
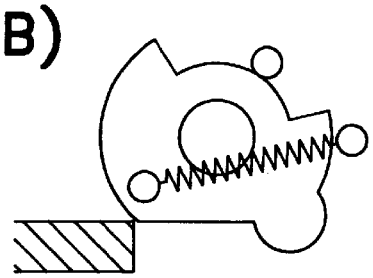
Figure 4C:
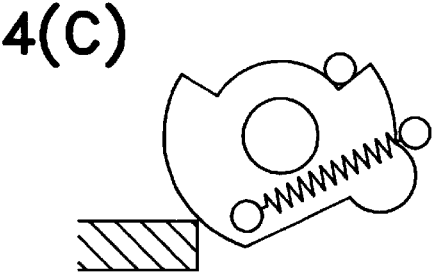
Figure 4D:
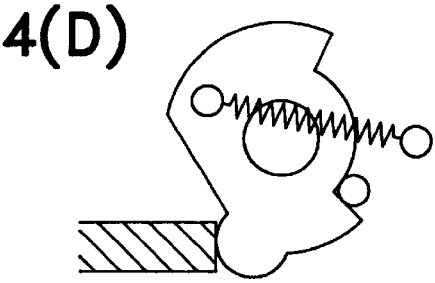
Figure 4E:
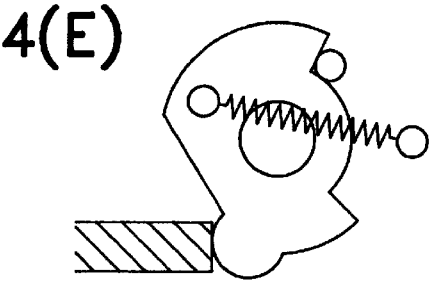

The fuel valve 7, as shown in FIGS. 1, 2 and 3, is in the almost fully extended piston 15 position with the stop valve 8 closed, and corresponds to the position of the engagement mechanism shown in FIG. 4(V). The piston 15 can extend a small distance further until it is impeded by the pin 17 bearing against the end of the plunger groove 16 which is adjacent the compression spring 14.

If an attempt is now made to start the vehicle to which the fuel valve is fitted, the fuel pump is started and the fuel line 6 is pressurized. The pressure will overcome the piston spring 13 and retract the piston 15 along the piston bore. This movement will cause the piston extension 22 to push against a lobe on the profile plate 25 and cause it to rotate to the position shown in FIG. 4(I), simultaneously causing the tension spring 26 to first extend and then relax as it crosses over centre. The movement will also cause the plunger 11 to be drawn by the pin 17 and groove 16 away from the seating 12, thus opening the stop valve and allowing fuel to pass freely to the outlet port 3. This condition remains for as long as the fuel pump stays running and has the important safety advantage that the fuel valve cannot accidentally close while the vehicle is running due to vibration, impact or similar cause.

When the vehicle engine is subsequently switched off, the fuel pump is simultaneously stopped and the fuel line will become depressurized as a small amount of fuel passes through the leakage notch. The piston spring 13 will urge the piston to extend which it will do as fuel is slowly displaced from the fuel passage 6 via the low pressure relief valve 20 and notch in the high pressure relief 21 seating. The notch is made of a size such that the extension movement takes an amount of time which is not so long as to detract from the security aspect of the lock, but, yet sufficiently long such that the valve will not relock itself in the event of the vehicle ignition being switched off and then on again if the engine should stall or similar.

As the extension movement proceeds, the piston extension 22 will eventually clear the end of an edge formed in the profile plate 25, as shown in FIG. 4(II), following which the profile plate 25 will rotate anti-clockwise, as seen in the figure, under the influence of the tension spring 26, and move to the position shown in FIG. 4(III).

In the extended position shown in FIG. 4(III), the plunger seal 10 is firmly urged against the seating 12 and the stop valve 8 thus closed. Because of the possible relative movement allowed between the piston 15 and plunger 11 by the pin 17 and groove 16 arrangement, the stop valve 8 remains firmly closed over a range of positions of the piston 15, including the position shown in FIG. 4(II) and also the position, not shown, where the piston extends a small distance further under the influence of the piston spring 13. The feature also has the advantage of easing manufacturing, assembly and service tolerances.

It can be seen from FIG. 4(III) that in this position the fuel valve has automatically locked itself and any attempt to restart the engine will be prevented because the profile plate 25 now prevents the piston extension 22 from extending under the influence of the fuel pump and pressure in the fuel passage 6. This automatic self locking feature of the valve is considered to be highly advantageous as it ensures that the fuel valve is always locked when the vehicle is taken out of use.

The locked fuel valve 7 can only be opened by means of the key lock mechanism 23. By means of a key, the key lock spindle, and thus the output plate 30, can be rotated through 90°. This rotation moves the profile plate 25 from the locked position shown in FIG. 4(III) to the unlocked position shown in FIG. 4(IV) by means of the driving pin 29 bearing against a radial edge provided on the profiled plate 25. This movement will again cause the tension spring 26 to first extend and then relax as it crosses over centre.

It may be found advantageous to provide a further spring, which is not shown in the figures, which allows the profile plate to snap into the position shown in FIG. 4(IV), and which helps to hold it in that position until it is subsequently snapped out of it by the action of the extension of the piston extension 22. This spring should be arranged such that it does not make contact with or impose any frictional restraint on the profile plate 25 when the profiled plate 25 is pulled into the locked position by the tension spring 26 in the movement shown in FIGS. 4(II) and 4(III).

The key lock mechanism 23 is of the type where the key must be returned to its starting position before it can be withdrawn from the lock body. The key return position is shown in FIG. 4(V).

As shown in FIG. 4(V), the fuel valve is now in the unlocked position and operation of the fuel pump will fully open the stop valve 8 as has already been described.

The fuel valve has the advantage that it can be unlocked prior to switching on the vehicle ignition or fuel pump. Thus, the fuel valve key and ignition key can be left on the same key ring. This has the further advantage of ensuring that the fuel valve key will not be accidentally left in the fuel valve when the vehicle is unattended.

In another embodiment of the invention, a stop valve is opened by the movement of a key operated locking device and is held open by a mechanism until released to relock automatically the valve when the fuel line changes pressure resulting from a stoppage of the fuel pump or fuel pressure source or when the fuel line passes through a cycle of pressure change resulting from a commencement and later stoppage of the fuel pump or fuel pressure source. The mechanism is operated by means of the line pressure of the fuel acting on a pressure responsive element such as a piston, diaphragm or bellows and may incorporate a time delay feature by routing some or all of the fuel to or from the pressure responsive element through an aperture or flow restriction valve.

It will of course be understood that the invention is not limited to the specific details described herein, which are given by way of example only, and that various modifications and alterations are possible within the scope of the invention as defined in the appended claims.

I claim:

1. A mechanically lockable valve for a fuel line, said valve comprising:

a fuel flow closure or restriction valve and a mechanical pressure responsive element including a piston and a plunger mounted in a bore of the piston and movable in response to a pressure change in the fuel line, and a locking mechanism associated with the piston and the fuel flow closure or restriction valve, whereby when a particular change of pressure in the fuel line is detected by the mechanical responsive element, operation of the closure or restriction valve and the locking mechanism causes fuel flow to be stopped or be restricted and fuel flow being allowed to resume by an unlocking action of the locking mechanism.

2. A lockable valve for a fuel line according to claim 1, wherein a mechanical delay mechanism is provided between the pressure responsive element and the closure or restriction valve, the mechanical delay mechanism having a restricted flow device operable to allow partial fuel flow for a period after detection of a particular pressure change.

3. A lockable fuel valve as claimed in claim 2, wherein the valve includes a fuel passage in communication with a return passage via a cross passage, the cross passage accommodating the mechanical delay mechanism which comprises two pressure relief valves situated in series, one being a higher pressure relief valve being set at a pressure above that of a main pressure relief valve in the fuel line, and being operable to open and return fuel back to a tank via the return passage if fuel is continued to be supplied with the valve closed.

4. A lockable valve as claimed in claim 1, wherein the fuel flow closure or restriction valve comprises a stop valve including a flexible seal mounted on the plunger which is urged against a seat by action of a spring, the plunger being located in the bore in the piston with the plunger and piston having coincident axes, the plunger being movable to a limited degree in a direction along its axis within the bore in the piston, the movement being limited by a pin partially located within an annular groove in the plunger.

5. A lockable fuel valve as claimed in claim 4, wherein the spring is positioned at a bottom of the bore in the piston and urges the plunger from the bore, a front end of the plunger being shaped to accommodate a circumferential seal of a flexible material impervious to fuel.

6. A lockable fuel valve as claimed in claim 1, wherein the locking mechanism includes a key-operable locking mechanism and an engagement mechanism comprising a profiled plate rotatable about an axial extension of the key-operable locking mechanism, an over-centre tension spring connecting the profiled plate to a fixed anchorage pin, and a driving pin fixed to an output plate of the key-operable locking mechanism, with the profiled plate being in engagement with a portion of the pressure responsive element.

7. A lockable fuel valve as claimed in claim 6, wherein the key-operable locking mechanism must be returned to a starting position before a key can be withdrawn from a lock body.

8. A lockable fuel valve as claimed in claim 1, wherein undesired leakage of fuel from the fuel line past an outer bore of the piston is prevented by a circumferential seal located in an annular groove in the piston.

* * * * *